UNITED STATES PATENT OFFICE 2,376,860

ARYL CARBOXYLIC ACID ESTERS AND METHODS FOR OBTAINING THE SAME

Frederick F. Blicke, Ann Arbor, Mich., assignor to The Regents of the University of Michigan, Ann Arbor, Mich., a body corporate of Michigan No Drawing. Application July 12, 1941,
Serial No. 402,244

7 Claims. (Cl. 260—247)

This invention relates to the preparation of new aminoalkyl esters of substituted phthalic acids and their acid addition salts, said compounds being useful anesthetics of surprisingly high potency.

The new esters are representable by the following structural formula:

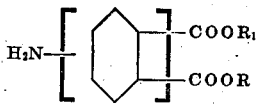

where R is a member of the class consisting of alkyl, alkoxy alkyl, mono-alkyl amino alkyl, dialkyl amino alkyl, N-morpholino alkyl, and N-piperidino alkyl, and where $R_1$ is a member of the class consisting of mono-alkyl amino alkyl, dialkyl amino alkyl, N-morpholino alkyl and N-piperidino alkyl.

It will be appreciated that the above generic formula comprehends several isomeric classes of compounds in which the substituent Y occupies different positions with regard to the aminoalkyl ester substituent.

The numbering scheme is as follows:

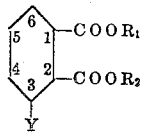 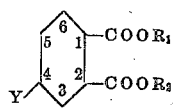

In all cases the compounds in which Y is $-NH_2$ can readily be prepared from the corresponding compounds in which Y is $-NO_2$ by treatment of the latter type of compound with a reducing agent capable of reducing a $-NO_2$ group to a $-NH_2$ group. Such reducing agents and techniques include the use of stannous chloride, iron powder in aqueous suspension, titanous chloride, catalytic hydrogenation in the presence of a suitable catalyst such as platinum, palladium or nickel, and so forth.

The compounds in which Y is $-NO_2$ can be prepared from the nitrophthalic acids or the anhydrides thereof.

For example, 3-nitrophthalic anhydride may be mono-esterified by treatment with an aliphatic alcohol such as ethyl alcohol, amyl alcohol, ethylene glycol mono-ethyl ether, diethylamino-ethyl alcohol, cetyl alcohol, N-morpholino-ethanol, etc. Thus, there is obtained a compound of the formula,

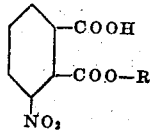

where R is an alkyl, alkoxyalkyl or substituted-amino-alkyl. This substance may then be further esterified with a sec- or tert- aminoalkanol, thereby forming a compound of the type,

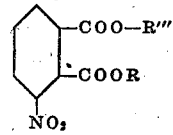

where R''' is an alkyl group substituted by a sec- or tert- amino group.

The esterification in the last step above and in similar examples which will follow, may be accomplished by a variety of methods. For example, the acid may be converted into the corresponding acyl halide by treatment with thionyl chloride, phosphorus pentachloride, phosphorus tribromide and similar halogenating agents; the acyl halide thus produced is reacted with the aminoalkanol, thereby providing the desired ester. Alternatively, the acyl halide may be reacted with a haloalkanol, such as ethylene bromohydrin, and the resulting ester subsequently condensed with a pri- or sec- amine.

I have found that aminoalkanol esters of substituted phthalic acids are readily prepared by reacting the corresponding acid, e. g., the 2-monoethyl ester of 3-nitro-phthalic acid, with a tert-aminoalkyl halide. This may be illustrated by the following equation:

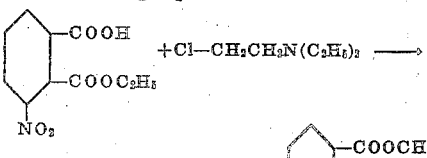

It is evident that this condensation yields the esters in the form of their hydrohalides. The ester bases are readily prepared from the hydrohalides by treatment with an alkaline reagent such as potassium hydroxide, sodium carbonate, and the like.

To prepare isomeric compounds of my invention, advantage is taken of the fact that 3-nitro-phthalic anhydride reacts with alcohols to form monoesters isomeric with those obtained by direct monoesterification of 3-nitrophthalic acid with the alcohol. This may readily be seen by a comparison of the general equations for the two types of reactions,

A

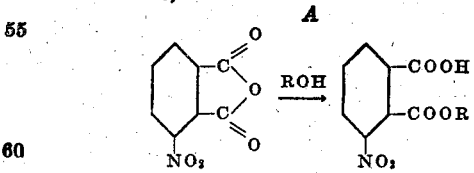

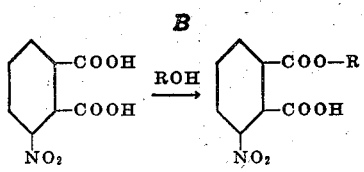

Reaction A takes place simply on heating the alcohol, ROH, with the anhydride; but to effect reaction B, it is usually necessary to heat the acid with the alcohol in the presence of a strong acid catalyst such as sulfuric acid, hydrochloric acid, or p-toluenesulfonic acid.

When 4-nitrophthalic acid or its anhydride are used according to schemes B or A respectively, using a simple unsubstituted alcohol such as ethyl alcohol or amyl alcohol, the same product is obtained in each case, namely, the 1-mono-ester of 4-nitrophthalic acid,

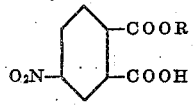

However, the isomeric product,

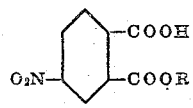

is obtained by employing either method A or B on a substituted alcohol such as ethylene bromohydrin or diethylaminoethyl alcohol.

It will be evident in view of the foregoing discussion that by a suitable combination of the methods described above, any of the isomeric compounds of my invention may readily be obtained.

The new compounds of my invention, comprising both the basic esters and their acid addition salts, have great utility as anesthetics. Higher members of the series, wherein R is a large alkyl radical, are oil soluble while the lower members are relatively more soluble in water. The new compounds may be used topically, for which purpose some of the esters are considerably more effective than Butyn (dibutylaminopropyl p-aminobenzoate). As anesthetics for injection they are much more efficacious than procaine (diethylaminoethyl p-aminobenzoate) and are less toxic than cocaine.

For many purposes the new anesthetics are best employed in the form of their substantially non-toxic-acid addition salts. Such salts include the hydrochlorides, hydrobromides, sulfates, sulfamates, phophates, borates, acetates, citrates, tartrates, malates, lactates, and so on. The term "substantially non-toxic acid" used in this connection in this specification, and in the appended claims is to be understood to mean acids which are not toxic in the amounts administered in combination with the anesthetic.

The salts described above are readily prepared by reaction of the ester base with the acid, preferably in a solvent in which both the base and the acid are soluble.

It will be noted that in the case where Y is —$NH_2$ the new anesthetic bases have at least two amino groups. Of these the amino group in the side chain or ester grouping is considerably more basic, so that commonly, only this group is involved in salt formation. However, the ring amino group may be involved in salt formation if a considerable excess of acid is employed.

My invention can be further illustrated by the following examples:

*Example 1.—Preparation of 1-ethyl 2-(β-diethylaminoethyl) 3-amino-phthalate*

A. *1-ethyl 3-nitroacidphthalate.*—A mixture of 105.5 of 3-nitrophthalic acid (Culhane and Woodward, Organic Syntheses, collective volume I, John Wiley and Sons, Inc., New York, 1932, p. 399), 100 cc. of absolute alcohol and 10 cc. of concentrated sulfuric acid is heated at 125° in an oil-bath for nine hours. The excess alcohol is removed by distillation under diminished pressure, the residue washed with cold water and treated with 10% sodium carbonate solution. The alkaline mixture is extracted several times with ether to remove diethyl 3-nitrophthalate and then acidified with dilute hydrochloric acid. The solid monoethyl ester of 3-nitrophthalic acid which precipitates is filtered and recrystallized from benzene; M. P. 11–112° C.

B. *1-ethyl 2-(β-diethylaminoethyl) 3-nitrophthalate.*—A solution of 11.9 of 1-ethyl 3-nitroacid-phthalate and 6.5 of β-diethylaminoethyl chloride in 30 cc. of isopropyl alcohol (which previously has been treated with sodium and distilled) is refluxed on a steam-bath for twelve hours. The solvent is removed by distillation under diminished pressure and the residue washed with absolute ether. This residue is the hydrochloride of 1-ethyl 2-(β-diethylaminoethyl) 3-nitrophthalate, and it may be purified by recrystallization from a mixture of ethyl acetate and absolute alcohol; M. P. 126–128° C.

Anal.: Calcd. for $C_{16}H_{23}O_6N_2Cl$: Cl, 9.46. Found: Cl, 9.64.

C. *1-ethyl 2-(β-diethylaminoethyl) 3-aminophthalate hydrobromide.*—To a solution of 8.8 of 1-ethyl 2-(β-diethylaminoethyl) 3-nitrophthalate in 10 cc. of acetic acid is added 16.5 of powdered stannous chloride dihydrate. The mixture becomes hot suddenly and it is necessary to cool it rapidly. It is then saturated with hydrogen chloride, the temperature being maintained at 40–50°. Any undissolved stannous chloride soon disappears. After three to four hours the mixture is dissolved in 100 cc. of water and treated with a 10% solution of sodium hydroxide until the tin hydroxide has precipitated and redissolved. During this process the mixture must be cooled. The liberated oily base is extracted with ether and the ethereal solution dried with sodium sulfate. The solvent is removed and the oily residue treated with 0.908 cc. of concentrated hydrobromic acid (48%). After thirty minutes the oily hydrobromide of 1-ethyl 2-(β-diethylaminoethyl) 3-aminophthalate is rubbed under anhydrous ether, whereupon it solidifies immediately. It is recrystallized from a mixture of ethyl acetate and absolute alcohol; M. P. 112–113° C.

Anal.: Calcd. for $C_{16}H_{25}O_4N_2Br$: Br, 20.52. Found: 20.60.

*Example 2.—Preparation of 1-isopropyl 2-(β-diethylaminoethyl) 3-aminophthalate*

A. *2-(β-diethylaminoethyl) 3-nitroacidphthalate.*—To a solution of 59.7 g. of 3-nitrophthalic anhydride (Nicolet and Bender Organic Syntheses, coll. vol. I, John Wiley and Sons, Inc., New York, 1932, p. 402) in 500 cc. of hot, dry benzene is added, in portions, 35.1 g. of diethylaminoethyl alcohol. The mixture is refluxed on a steam bath for three hours. The mono-diethylaminoethyl ester of 3-nitrophthalic acid, which precipitates when the benzene solution is cooled, is filtered and recrystallized from alcohol; M. P. 167–168° C.

Anal.: Calcd. for $C_{14}H_{18}O_6N_2$: N, 9.03. Found: N, 9.00.

B. *Acid chloride of 2-(β-diethylaminoethyl) 3-nitroacidphthalate.*—A mixture of 15.5 g. of 2-(β-diethylaminoethyl) 3-nitroacidphthalate and 30 cc. of thionyl chloride is refluxed on a steam bath for five hours. The excess thionyl chloride is removed by distillation under reduced pressure and the gummy residue washed in the reaction flask with absolute ether. The crude hydrochloride of the acid chloride of 2-(β-diethylaminoethyl) 3-nitroacidphthalate is used in the following preparation without further purification.

C. *1-isopropyl 2-(β-diethylaminoethyl) 3-nitrophthalate hydrobromide.*—The acid chloride, described above, is dissolved in 30 cc. of isopropyl alcohol, the solution is refluxed on a steam bath for three hours and the excess alcohol then removed by distillation under diminished pressure. The residue is cooled, dissolved in water, the solution made alkaline with 10% sodium carbonate solution, extracted three times with ether, and the combined ether extracts dried with sodium sulfate. After removal of the solvent, 16.86 g. of the oily base is treated with the calculated amount of concd. hydrobromic acid (48%). The hydrobromide of the diester is washed with absolute ether and recrystallized with ethyl acetate; M. P. 110–111° C.

Anal.: Calcd. for $C_{17}H_{25}O_6N_2Br$: Br, 18.44. Found: Br, 18.50.

D. *1-isopropyl 2-(β-diethylaminoethyl) 3-aminophthalate citrate.*—A mixture of 14.5 g. of 1-isopropyl 2-(β-diethylaminoethyl) 3-nitrophthalate hydrobromide, 10 cc. of acetic acid and 27.9 g. of powdered stannous chloride dihydrate is treated with hydrogen chloride in the manner described in Example 1C. In order to prepare the citrate, 7.15 g. of the oily diester base and 4.65 g. of citric acid monohydrate are heated in absolute alcoholic solution (25 cc.) on a steam bath for about ½ hour. The solvent is evaporated and the residue washed with absolute ether, whereupon it becomes crystalline. The citrate of 1-isopropyl 2-(β-diethylaminoethyl) 3-aminophthalate melts at 86–89° C.

Anal.: Calcd. for $C_{23}H_{34}O_{11}N_2$: N, 5.44. Found: N, 5.51.

*Example 3.—Preparation of 1-(β-diethylaminoethyl) 2-n-propyl 3-aminophthalate*

A. *2-propyl 3-nitroacidphthalate.*—A solution of 48.5 g. of 3-nitrophthalic anhydride in 75 cc. of dry n-propyl alcohol is refluxed on a steam bath for five hours and the excess alcohol removed by distillation under reduced pressure. The residue is cooled, treated with a 10% solution of sodium carbonate, the mixture filtered and the filtrate acidified with concd. hydrochloric acid. The precipitated mono-ester is collected by filtration and recrystallized from dilute alcohol; M. P. 139–140° C.

B. *1-(β-diethylaminoethyl) 2-n-propyl 3-nitrophthalate hydrochloride.*—A mixture of 12.65 g. of 2-n-propyl 3-nitroacidphthalate, 6.6 g. of β-diethylaminoethyl chloride (Slotta and Behnisch, Ber., 68, 758 (1935)) and 30 cc. of dry isopropyl alcohol is refluxed on a steam bath for five hours and the solvent removed by distillation under reduced pressure. The crude hydrochloride of the diester is purified by recrystallization from ethyl acetate; M. P. 111–112° C.

Anal.: Calcd. for $C_{17}H_{25}O_6N_2Cl$: Cl, 9.12. Found: Cl, 924.

C. *1-(β-diethylaminoethyl) 2-n-propyl 3-aminophthalate hydrochloride.*—The nitro group in the diester is reduced in a manner analogous to that described in Example 1C. The hydrochloride of 1-(β-diethylaminoethyl) 2-n-propyl 3-aminophthalate is prepared by treating the oily base with the calculated amount of concd. hydrochloric acid and purified by recrystallization from a mixture of ethyl acetate and absolute alcohol; M. P. 129–130° C.

Anal.: Calcd. for $C_{17}H_{27}O_4N_2Cl$: Cl, 9.88. Found: Cl, 9.96.

My invention is not limited to the 3-amino- and 3-nitrophthalic acid esters described in the above examples. By using essentially the same procedures many similar ester types may be prepared. The following list gives some of the new compounds with their melting points:

*Salts of esters of 3-nitrophthalic acid*

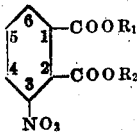

| No. | $R_1$ | $R_2$ | Formula | M. P., °C. |
|---|---|---|---|---|
| 1 | $CH_3$ | $CH_2CH_2N(C_2H_5)_2$ | $C_{15}H_{20}O_6N_2.HCl$ | 139–140 |
| 2 | $CH_2CH_3$ | do | $C_{16}H_{22}O_6N_2.HCl$ | 126–128 |
| 3 | $CH_2CH_2CH_3$ | do | $C_{17}H_{24}O_6N_2.HCl$ | 93–95 |
| 4 | $CH(CH_3)_2$ | do | $C_{17}H_{24}O_6N_2.HBr$ | 110–111 |
| 5 | $CH_2CH_2CH_2CH_3$ | do | $C_{18}H_{26}O_6N_2.HBr$ | 73–75 |
| 6 | $CH_2CH(CH_3)_2$ | do | $C_{18}H_{26}O_6N_2.HBr$ | 155–156 |
| 7 | $CH(CH_3)CH_2CH_3$ | do | $C_{18}H_{26}O_6N_2.CH_3I$ | 86–88 |
| 8 | $CH_2(CH_2)_3CH_3$ | do | $C_{18}H_{26}O_6N_2.HBr$ | 91–93 |
| 9 | $CH_2(CH_2)_4CH_3$ | do | $C_{19}H_{28}O_6N_2.HBr$ | 50–53 |
| 10 | $CH_2CH_2CH_3$ | $CH_2C(CH_3)_2CH_2N(CH_3)_2$ | $C_{20}H_{30}O_6N_2.CH_3I$ | 164–166 |
| 11 | $CH_2CH_2N(C_2H_5)_2$ | $CH_2CH_2N(C_2H_5)_2$ | $C_{18}H_{26}O_6N_2.HBr$ | 143–144 |
| 12 | do | $CH_3$ | $C_{20}H_{31}O_6N_3.2HBr$ | 145–146 |
| 13 | do | $CH_2CH_3$ | $C_{15}H_{20}O_6N_2.HCl$ | 126–128 |
| 14 | do | $CH_2CH_2CH_3$ | $C_{16}H_{22}O_6N_2.HCl$ | 111–112 |
| 15 | do | $CH(CH_3)_2$ | $C_{17}H_{24}O_6N_2.HCl$ | 124–126 |
| 16 | do | $CH_2CH_2CH_2CH_3$ | $C_{17}H_{24}O_6N_2.HCl$ | 80–82 |
| 17 | do | $CH_2CH(CH_3)_2$ | $C_{18}H_{26}O_6N_2.HCl$ | 125–127 |
| 18 | do | $CH(CH_3)CH_2CH_3$ | $C_{18}H_{26}O_6N_2.HBr$ | 71–73 |
| 19 | do | $CH_2(CH_2)_3CH_3$ | $C_{19}H_{28}O_6N_2.HCl$ | 64–66 |
| 20 | do | $CH_2(CH_2)_4CH_3$ | $C_{20}H_{30}O_6N_2.HCl$ | 84–86 |
| 21 | do | $CH_2(CH_2)_{10}CH_3$ | $C_{26}H_{42}O_6N_2.HCl$ | 89–90 |
| 22 | do | $CH_2(CH_2)_{16}CH_3$ | $C_{32}H_{54}O_6N_2.HCl$ | 137–139 |
| 23 | $CH_2CH_2CH_2NC_5H_{10}$ | $CH_2CH_2CH_3$ | $C_{19}H_{28}O_6N_2.HBr$ | 155–156 |
| 24 | $CH_2CH_2CH_3$ | $CH_2CH_2CH_3$ | $C_{22}H_{34}O_6N_2.CH_3I$ | 164–165 |
| 25 | $CH_2C(CH_3)_2CH_2N(CH_3)_2$ | $CH_2CH_2CH_3$ | $C_{18}H_{28}O_6N_2.CH_3I$ | |

Salts of esters of 3-aminophthalic acid

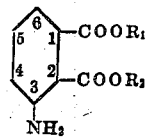

| No. | R₁ | R₃ | Formula | M. P., °C. |
|---|---|---|---|---|
| 1 | CH₃ | CH₂CH₂N(C₂H₅)₂ | C₁₅H₂₂O₄N₂.HCl | 114–115 |
| 2 | CH₂CH₃ | do | C₁₆H₂₄O₄N₂.HBr | 112–113 |
| 3 | CH₂CH₂CH₃ | do | C₁₇H₂₆O₄N₂.HBr | 107–108 |
| 4 | CH(CH₃)₂ | do | C₁₇H₂₆O₄N₂.C₆H₈O₇(citrate) | 86–89 |
| 5 | CH₂CH₂CH₂CH₃ | do | C₁₈H₂₈O₄N₂.HBr | 91–92 |
| 6 | CH₂CH(CH₃)₂ | do | C₁₈H₂₈O₄N₂.HBr | 110–112 |
| 7 | CH(CH₃)CH₂CH₃ | do | C₁₈H₂₈O₄N₂.C₆H₈O₇(citrate) | 92–95 |
| 8 | CH₂(CH₂)₃CH₃ | do | C₁₉H₃₀O₄N₂.C₆H₈O₇(citrate) | 81–83 |
| 9 | CH₂(CH₂)₄CH₃ | do | C₂₀H₃₂O₄N₂.C₆H₈O₇(citrate) | 79–81 |
| 10 | CH₂CH₂CH₃ | CH₂C(CH₃)₂CH₂N(CH₃)₂ | C₁₈H₂₈O₄N₂.C₆H₈O₇(citrate) | 145–146 |
| 11 | CH₃ | CH₂CH₂N(C₂H₅)₂ | C₁₅H₂₂O₄N₂.HCl | 150–152 |
| 12 | CH₂CH₃ | do | C₁₆H₂₄O₄N₂.HCl | 139–140 |
| 13 | CH₂CH₂CH₃ | do | C₁₇H₂₆O₄N₂.HCl | 129–130 |
| 14 | CH(CH₃)₂ | do | C₁₇H₂₆O₄N₂.HCl | 153–154 |
| 15 | CH₂CH₂CH₂CH₃ | do | C₁₈H₂₈O₄N₂.HCl | 117–118 |
| 16 | CH₂CH(CH₃)₂ | do | C₁₈H₂₈O₄N₂.HCl | 118–119 |
| 17 | CH(CH₃)CH₂CH₃ | do | C₁₈H₂₈O₄N₂.HBr | 117–118 |
| 18 | CH₂(CH₂)₃CH₃ | do | C₁₉H₃₀O₄N₂.HBr | 90–92 |
| 19 | CH₂(CH₂)₄CH₃ | do | C₂₀H₃₂O₄N₂.C₆H₈O₇ | 72–74 |
| 20 | CH₂(CH₂)₁₀CH₃ | do | C₂₆H₄₄O₄N₂.C₆H₈O₇ | 84–86 |
| 21 | CH₂(CH₂)₁₆CH₃ | do | C₃₂H₅₆O₄N₂ (base) | 45–46 |
| 22 | CH₂CH₂CH₃ | CH₂CH₂CH₂NC₅H₁₀ (N-piperidino-n-propyl) | C₁₉H₂₉O₄N₂.HCl | 123–124 |
| 23 | CH₂CH₂CH₃ | CH₂CH₂CH₂N(C₄H₉)₂ | C₂₂H₃₆O₄N₂.HBr | 115–116 |
| 24 | CH₂CH₂CH₃ | CH₂C(CH₃)₂CH₂N(CH₃)₂ | C₁₈H₂₈O₄N₂.HBr | 139–141 |

It will be noted that some of the esters have been characterized in the form of their quaternary salts, since a few of the simple hydrohalides are not readily obtained in crystalline form.

*Example 4.—Preparation of 1-methyl 2-(β-diethylaminoethyl) 4-aminophthalate hydrochloride*

The 4-nitrophthalic anhydride used in the following preparation was obtained from 4-nitrophthalic acid (Huntress, Schloss and Ehrlich, Organic Syntheses, vol. 16, John Wiley & Sons, Inc., New York, 1936, p. 56) by the method of Culhane and Woodward (loc. cit.) used for the preparation of the corresponding 3-nitro compound.

A. *1-methyl 4-nitroacidphthalate.*—A mixture of 57.9 g. of 4-nitrophthalic anhydride and 150 cc. of absolute methyl alcohol is refluxed on a steam bath for about ten hours. The excess solvent is removed by distillation under reduced pressure. The cooled oily residue is washed well with water, whereupon a white solid separates. It is dissolved in 10% sodium carbonate solution to remove any diester which might have been formed and any unchanged anhydride. The sodium carbonate solution is neutralized with concd. hydrochloric acid. An oil separates which solidifies after being chilled in an ice bath for several hours. The solid is filtered, washed well with water, and recrystallized five times from hot water; M. P. 129–131° C.

B. *1-methyl 2-(β-diethylaminoethyl) 4-nitrophthalate hydrochloride.*—A solution of 2.25 g. of 1-methyl 4-nitroacidphthalate and 1.36 g. of diethylaminoethyl chloride in 30 cc. of isopropyl alcohol is refluxed for about ten hours on a steam bath. The excess solvent is removed by distillation under diminished pressure, and an oily residue obtained which solidifies after having been washed thoroughly with anhydrous ether; M. P. 164–169° C.

Anal.: Calcd. for C₁₅H₂₁O₆N₂Cl: Cl, 9.84. Found: Cl, 9.52.

C. *1-methyl 2-(β-diethylaminoethyl) 4-aminophthalate hydrochloride.*—The nitro group is reduced in a manner analogous to that described in Example 1C. The hydrochloride of 1-methyl 2-(β-diethylaminoethyl) 4-aminophthalate is prepared by the addition of the calculated amount of concd. hydrochloric acid to the oily base and purified by recrystallization from a mixture of ethyl acetate and alcohol; M. P. 166–168° C.

Anal.: Calcd. for C₁₅H₂₃O₄N₂Cl: Cl, 10.74. Found: Cl, 10.81.

*Example 5.—Preparation of 1-ethyl 2-(β-di-n-propylaminoethyl) 4-aminophthalate hydrochloride*

A. To a solution of 193 g. of 4-nitrophthalic anhydride in 200 cc. of dry benzene is added 131 g. of ethylene bromohydrin and the mixture is refluxed on a steam bath for one hour. The excess solvent is removed under reduced pressure. The residue and reddish oil is washed well with water and treated with a 10% sodium carbonate solution. The alkaline solution is shaken with ether and then neutralized with concd. hydrochloric acid; during the latter process, the mixture is cooled to prevent hydrolysis. The oil which separates becomes solid after being chilled for several hours in an ice bath. The white solid is filtered, washed well with water, and dried; M. P. 90–101° C.

Anal.: Calcd. for C₁₀H₈O₆NBr; Br, 25.15. Found: Br, 25.07.

B. *Acid chloride of 2-bromoethyl 4-nitroacidphthalate.*—A mixture of 13 g. of 2-bromoethyl 4-nitroacidphthalate and 25 g. of thionyl chloride is refluxed on a steam bath for three hours. The excess thionyl chloride is removed under reduced pressure and the crude, yellow oily chloride is used immediately in the subsequent preparation.

C. *1-ethyl 2 - bromoethyl 4-nitrophthalate.*—Twenty g. of the acid chloride described above is dissolved in dry benzene; 50 cc. of absolute alcohol is added, and the mixture refluxed for about two hours. The excess solvents are removed under diminished pressure and the brownish residue washed with 10% sodium carbonate solution, then with water, and finally taken up in ether. The ether solution is dried with fused sodium sulfate and the solvent removed. The diester is obtained in the form of a brownish oil.

mixture of ethyl acetate and alcohol; M. P. 114-116° C.

Anal.: Calcd. for $C_{18}H_{29}O_4N_2Cl$: Cl, 9.53. Found: Cl, 9.66

Other esters of 4-nitro-4-aminophthalic acid may be obtained by essentially the same procedures. For example, the following compounds have been made:

Salts of esters of 4-nitrophthalic acid

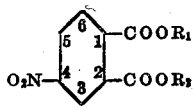

| No. | $R_1$ | $R_2$ | Formula | M. P., °C. |
|---|---|---|---|---|
| 1 | $CH_3$ | $CH_2CH_2N(C_2H_5)_2$ | $C_{15}H_{20}O_4N_2.HCl$ | 164-165 |
| 2 | $CH_2CH_3$ | do | $C_{16}H_{22}O_4N_2.HCl$ | 143-144 |
| 3 | $CH_2CH_2CH_3$ | do | $C_{17}H_{24}O_4N_2.HCl$ | 146-147 |
| 4 | $CH(CH_3)_2$ | do | do | 136-137 |
| 5 | $CH_2CH_2CH_2CH_3$ | do | $C_{18}H_{26}O_4N_2.HBr$ | 116-117 |
| 6 | $CH_2CH(CH_3)_2$ | do | $C_{18}H_{26}O_4N_2.HCl$ | 105-106 |
| 7 | $CH(CH_3)CH_2CH_3$ | do | do | 132-133 |
| 8 | $CH_2CH_3$ | $CH_2CH_2N(C_3H_7)_2$ | do | 143-144 |
| 9 | $CH_2CH_3$ | $CH_2CH_2NC_5H_{10}$ | $C_{17}H_{22}O_4N_2.HCl$ | 155-156 |
| 10 | $CH_2CH_3$ | $CH_2CH_2NC_4H_8O$ (N-morpholino-β-ethyl) | $C_{16}H_{21}O_5N_2.HCl$ | 120-121 |
| 11 | $CH_2CH_2N(C_2H_5)_2$ | $CH_2CH_2N(C_2H_5)_2$ | $C_{20}H_{31}O_4N_2.2CH_3I$ | 192-194 |

Salts of esters of 4-aminophthalic acid

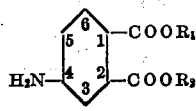

| No. | $R_1$ | $R_2$ | Formula | M. P., °C. |
|---|---|---|---|---|
| 1 | $CH_3$ | $CH_2CH_2N(C_2H_5)_2$ | $C_{15}H_{22}O_4N_2.HCl$ | 166-168 |
| 2 | $CH_2CH_3$ | do | $C_{16}H_{24}O_4N_2.HCl$ | 152-153 |
| 3 | $CH_2CH_2CH_3$ | do | $C_{17}H_{26}O_4N_2.HBr$ | 117-118 |
| 4 | $CH(CH_3)_2$ | do | $C_{17}H_{26}O_4N_2.C_6H_8O_7$ (citrate) | 97-99 |
| 5 | $CH_2CH_2CH_2CH_3$ | do | $C_{18}H_{28}O_4N_2.C_6H_8O_7$ (citrate) | 93-94 |
| 6 | $CH_2CH(CH_3)_2$ | do | $C_{18}H_{28}O_4N_2.C_6H_8O_7$ (citrate) | 102-104 |
| 7 | $CH(CH_3)CH_2CH_3$ | do | $C_{18}H_{28}O_4N_2.C_6H_5CH_2I$ (benzyl iodide) | 79-83 |
| 8 | $CH_2CH_3$ | $CH_2CH_2N(C_3H_7)_2$ | $C_{18}H_{28}O_4N_2.HCl$ | 114-116 |
| 9 | do | $CH_2CH_2NC_5H_{10}$ | $C_{17}H_{24}O_4N_2.HCl$ | 182-183 |
| 10 | do | $CH_2CH_2NC_4H_8O$ | $C_{16}H_{22}O_5N_2.HCl$ | 181-182 |

D. *1-ethyl 2-(β-di-n-proplyaminoethyl) 4-nitrophthalate hydrochloride.*—A solution of 37.5 g. of 1-ethyl 2-bromoethyl 4-nitrophthalate and 27.4 g. of di-n-proplyamine in 30 cc. of dry toluene is refluxed in an oil bath at 110-115° C. for four hours. The white crystalline precipitate of di-n-propylamine hydrobromide is removed by filtration and the filtrate concentrated. The residue is washed well with water and then dissolved in 5% hydrochloric acid. The solution is made alkaline with a 10% sodium carbonate solution and the basic ester extracted with ether. The solution is dried with fused sodium sulfate, and the solvent removed. To the weighed oily residue is added the calculated amount of a standardized alcoholic solution of hydrogen chloride. The excess of alcohol is removed and the residue washed with anhydrous ether. The white solid which separates is recrystallized from a mixture of ether acetate and alcohol; M. P. 143-144° C.

Anal.: Calcd. for $C_{18}H_{27}O_6N_2Cl$: Cl, 8.82. Found: Cl, 8.96.

E. *1-ethyl 2-di-n-propylaminoethyl 4-aminophthalate hydrochloride.*—This compound is prepared from the corresponding nitro ester in the manner described in Example 1C. The hydrochloride is prepared by treating the oily base with the calculated amount of concd. hydrochloric acid, and purified by recrystallization from a Some of the monoesters of 4-aminophthalic acid which have been used as intermediates are new compounds. For example, the following have been made:

1-monoalkyl esters of 4-nitrophthalic acid

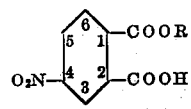

| No. | R | Formula | M. P., °C. |
|---|---|---|---|
| 1 | $CH_3$ | $C_9H_7O_6N$ | 129-131 |
| 2 | $CH_2CH_3$ | $C_{10}H_9O_6N$ | 127 |
| 3 | $CH_2CH_2CH_3$ | $C_{11}H_{11}O_6N$ | 73-75 |
| 4 | $CH(CH_3)_2$ | do | 149-150 |
| 5 | $CH_3CH(CH_3)_2$ | $C_{12}H_{13}O_6N$ | 108-109 |
| 6 | $CH(CH_3)CH_2CH_3$ | do | 112-114 |
| 7 | $CH_2CH_2CH_2CH_3$ | do | oil |

What I claim as my invention is:

1. A compound of the class an amino alkyl ester of a nuclearly amino substituted phthalic acid and its substantially non-toxic acid addition salts characterized by the following formula for the ester,

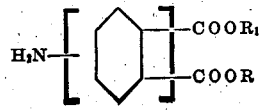

where R is an alkyl radical containing not more than 7 carbon atoms and R₁ is a member of the class consisting of dialkyl amino alkyl, N-morpholino alkyl and N-piperidino alkyl.

2. A compound of the class an amino alkyl ester of a nuclearly amino substituted phthalic acid and its substantially non-toxic acid addition salts characterized by the following formula for the ester,

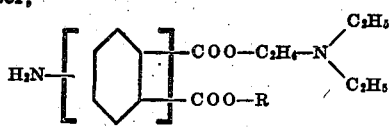

where R is an alkyl radical containing not more than seven carbon atoms.

3. A compound of the class an amino alkyl ester of a nuclearly amino substituted phthalic acid and its substantially non-toxic acid addition salts characterized by the following formula for the ester,

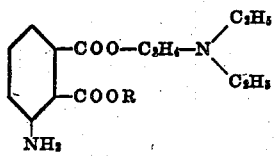

where R is an alkyl radical containing not more than seven carbon atoms.

4. The class of compounds consisting of the free amino form and its substantially non-toxic-acid addition salt forms of an aminoalkyl ester of a phthalic acid of the formula,

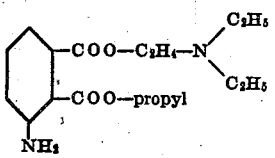

5. The class of compounds consisting of the free amino form and its substantially non-toxic-acid addition salt forms of an aminoalkyl ester of a phthalic acid of the formula,

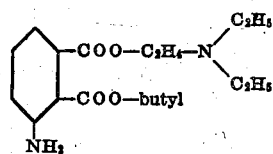

6. The class of compounds consisting of the free amino form and its substantially non-toxic-acid addition salt forms of an aminoalkyl ester of a phthalic acid of the formula,

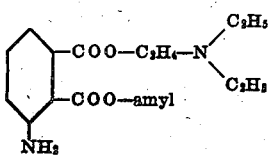

7. The class of compounds consisting of the free amino form and its substantially non-toxic-acid addition salt forms of an aminoalkyl ester of a phthalic acid of the formula,

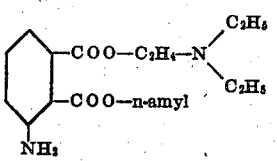

FREDERICK F. BLICKE.